United States Patent [19]

Connelly

[11] Patent Number: 4,521,077
[45] Date of Patent: Jun. 4, 1985

[54] LIGHT TRANSMITTING WINDOW ASSEMBLY

[75] Inventor: Dale L. Connelly, Forth Worth, Tex.

[73] Assignee: The United States of America as represented by the Administrator of the National Aeronautics & Space Administration, Washington, D.C.

[21] Appl. No.: 523,559

[22] Filed: Aug. 16, 1983

[51] Int. Cl.³ .......................... G02B 5/00; G02B 5/02; G02B 5/24
[52] U.S. Cl. .................... 350/319; 350/312; 350/321; 52/171
[58] Field of Search ............... 350/312, 319, 267, 321, 350/359, 1.5; 52/171, 309.13, 789

[56] References Cited

U.S. PATENT DOCUMENTS

| | | | |
|---|---|---|---|
| 2,439,553 | 4/1948 | Winn | 88/57.5 |
| 2,783,682 | 3/1957 | Swenson | 88/60 |
| 3,711,189 | 1/1973 | Novotny et al. | 350/319 |
| 4,044,519 | 8/1977 | Morin et al. | 52/304 |

*Primary Examiner*—John K. Corbin
*Assistant Examiner*—Lynn Vandenburgh Kent
*Attorney, Agent, or Firm*—Russell E. Schlorff; John R. Manning; Marvin F. Matthews

[57] ABSTRACT

This invention provides a light transmitting assembly that can, at will, be changed from a state of transparency to one of translucency. It comprises two parallel spaced apart panes of transparent material, such as glass, with a film of polytetrafluoroethane, which is inherently translucent or opaque, disposed between. The assembly is rendered transparent by introducing a fluid into the assembly to substantially cover a surface of the film; the fluid having a refractive index corresponding to the refractive index of the film. The translucency is restored by removing the fluid.

5 Claims, 1 Drawing Figure

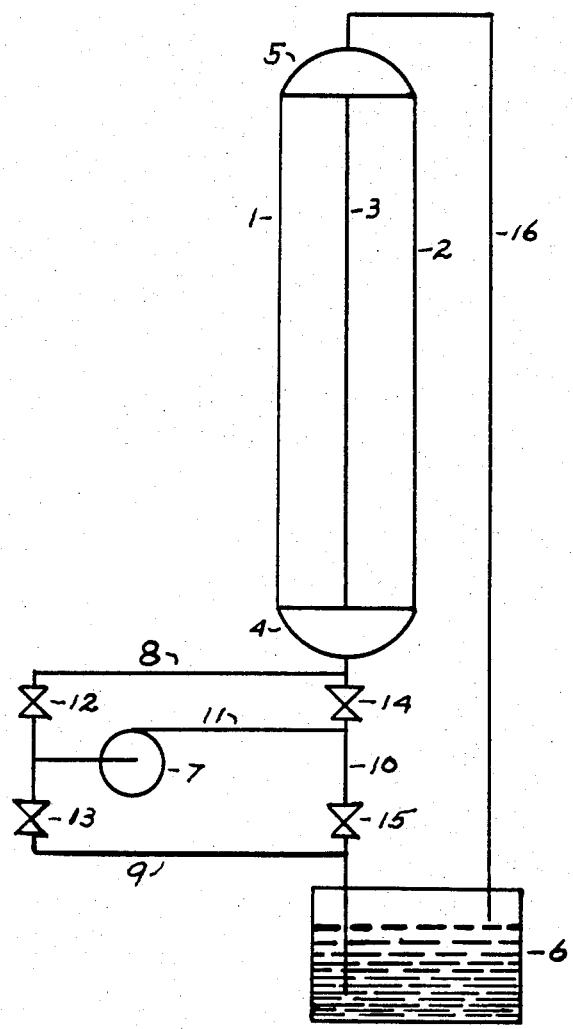
Fig.

LIGHT TRANSMITTING WINDOW ASSEMBLY

ORIGIN OF THE INVENTION

The invention described herein was made by an employee of the United States Government and may be manufactured and used by or for the Government of the United States of America for governmental purposes without the payment of any royalties thereon and therefor.

TECHNICAL FIELD

This invention relates to a light transmitting assembly which can, at will, be changed from an assembly that is substantially transparent to an assembly that is substantially translucent, and vice versa. By transparent is meant that the assembly transmits light without appreciable scattering so that bodies lying beyond are clearly visible. By translucent is meant that the assembly is relatively impervious to the transmission of visible light or that light transmission is so low that bodies lying beyond are indistinguishable. In the sense of this invention, translucence also includes total opacity.

BACKGROUND ART

Windows are employed in all types of construction, whether it be private, commercial, stationary or mobile, to provide for the desired transmission of visible light. At times it is desirable to be able to reduce or prevent light transmission through such windows. The common technique employed to accomplish this purpose is the use of shades, blinds, draperies and other opaque materials to cover the windows. In some types of window installation, these techniques present problems. This would be particularly true of larger windows or inaccessible windows, such as in overhead skylights.

The prior art discloses a further technique. In U.S. Pat. No. 2,783,682 there is disclosed a window assembly comprising two parallel spaced apart panes of glass with the inner surface of one pane being scalloped or fluted to disperse transmitted light rendering the assembly translucent rather than transparent. The assembly is rendered transparent by filling the space between the panes with a liquid having the same refractive index as glass. Translucency is restored by removing the fluid. A modification of this technique is described in U.S. Pat. No. 3,711,189. In this patent the window assembly comprises two parallel spaced apart panes of glass. To the inner surface of one of the panes is attached a fabric of closely woven transparent fibers. While the fibers per se are transparent the woven fabric is not, for obvious reasons, and, thus, the entire assembly is rendered translucent to opaque in the transmission of visible light. In this case the assembly is rendered transparent by filling the space between the panes with a liquid having the same refractive index as that of the transparent fibers.

While these two systems are, in general, operable, improvements in two respects are desirable. First, economy in operation suggests some means of reducing the amount of fluid required. In these prior art assemblies, the amount of fluid employed must be such to completely remove or fill the surface irregularities of the translucent element. Merely wetting the surface would not be sufficient. Second, the irregular surface of the translucent element hampers the clean and quick removal of the fluid when a change from transparency to translucency is desired. Droplets of the fluid will tend to cling to the irregular surfaces or be trapped in interstices.

It is an object of this invention to provide an improved window assembly which can be quickly, efficiently and reversibly changed from a substantially uniform state of translucency to a substantially uniform state of transparency. Other objects will become apparent from the description of the invention.

STATEMENT OF THE INVENTION

This invention is a window or light transmitting assembly comprising in combination, two parallel, spaced apart, panes of transparent material, such as glass; disposed between said panes a film of polytetrafluoroethylene; means for introducing into said assembly a fluid in an amount to substantially cover and be retained on at least one surface of said polytetrafluoroethylene film and means to remove said fluid; said fluid having a refractive index corresponding to the refractive index of said polytetrafluoroethylene.

DESCRIPTION OF THE DRAWINGS

The FIGURE is a schematic side view of a window assembly for the practice of this invention.

DESCRIPTION OF THE PREFERRED EMBODIMENT

Referring to the FIGURE, two parallel spaced apart flat panes of glass, 1 and 2, are provided. Any of various transparent plastic materials may be used in place of glass. Disposed between the panes of glass is polytetrafluoroethylene film 3. The polytetrafluoroethylene film is coextensive with the size of the panes of glass and the assembly is rigidly fixed by top and bottom caps 4 and 5 and side caps not shown. The fluid employed is contained in reservoir 6. By means of pump 7, lines 8, 9, 10 and 11 and valves 12, 13, 14 and 15, fluid from reservoir 6 can be pumped to fill the window assembly or withdraw fluid from the window assembly and return it to the reservoir. Vent line 16 facilitates the operation of the closed system.

With no fluid in the window assembly, the window assembly is translucent the degree of translucency depending upon the thickness of the polytetrafluoroethylene film. To render the window assembly transparent, the window assembly is filled with fluid from the reservoir 6. This is accomplished by closing valves 12 and 15, opening valves 13 and 14, and activating pump 7 until the window assembly is full of fluid. To render the window assembly translucent, the fluid is removed from the window assembly by closing valves 13 and 14, opening valves 12 and 15, and activating pump 7.

Polytetrafluoroethylene is particularly suitable in this application. It is readily available commercially in thin films or sheets of varying thicknesses. The polymer is milk-white and, as a result, films of the polymer vary in translucency or opacity with the thickness of the film or sheet of polymer. Thus the degree of translucency of a window assembly desired can be set by the thickness of the polymer film or sheet employed.

The operability of the present invention is not based upon any irregular surface phenomenon as is that of the previously mentioned prior art. Hence, the only amount of fluid required to be employed is that amount necessary to substantially fully wet the surface of the polymer. The lack of any need for irregular surfaces on the polymer film also greatly facilitates the total removal of fluid when a change from transparency to translucency is desired in the window assembly.

As previously mentioned, the translucency of polytetrafluoroethylene varies with the thickness of the film or sheet of the polymer. When employing relatively thin films of the polymer, such as 2 to 3 mils (0.05–0.08 mm.) in thickness, the polymer film can be rendered transparent by merely wetting or coating one surface of the film. As the polymer film or sheet employed increases in thickness, better results are obtained by coating or wetting both surfaces of the film or sheet.

Fluids employed in the practice of this invention are those having a refractive index in the range of from about 1.30 to about 1.40. Typical of such fluids that have been employed in the practice of this invention are acetone, isopropyl alcohol and trichlorotrifluoroethane.

While the invention has been described with particular reference to a conventional window assembly, interesting variations are possible providing many artistic options and applications. For example, instead of the flat panes of glass used in the conventional window assembly, the two panes can be curved similarly and spaced apart in a parallel relationship. Concentric cylinders of glass or other transparent material, with the film disposed between, may also be employed. An interesting variation comprises a single glass cylinder with a thin film of polytetrafluoroethylene affixed to the inside of the cylinder. In this case, the sides of the cylinder constitute the spaced apart surfaces of transparent material.

In the conventional window assembly, it would necessarily be desirable in most applications that the film of polytetrafluoroethane be coextensive with the panes of glass. In some applications, particularly for artistic purposes, the film can be less than coextensive or patterned to provide a desired design.

What is claimed is:

1. A light transmitting assembly comprising parallel spaced apart panes of transparent material with a film of polytetrafluoroethylene affixed between said panes, means to substantially coat at least one surface of said film with a fluid having a refractive index approximately equal to that of said film to render said film transparent and means to remove said fluid.

2. The light transmitting assembly of claim 1, wherein the transparent material is glass.

3. The light transmitting assembly of claim 2, wherein the fluid has a refractive index in the range of from about 1.30 to 1.40.

4. The light transmitting assembly of claim 3, wherein the fluid is acetone, isopropyl alcohol or trichlorotrifluoroethane.

5. The light transmitting assembly of claim 4, wherein the film of polytetrafluoroethane is coextensive with the panes of transparent material.

* * * * *